(12) United States Patent
Schmidt-Karaca

(10) Patent No.: US 11,580,440 B2
(45) Date of Patent: Feb. 14, 2023

(54) DYNAMIC FORM WITH MACHINE LEARNING

(71) Applicant: SAP SE, Walldorf (DE)

(72) Inventor: Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 1220 days.

(21) Appl. No.: 15/368,007

(22) Filed: Dec. 2, 2016

(65) Prior Publication Data
US 2018/0157987 A1    Jun. 7, 2018

(51) Int. Cl.
| | | |
|---|---|---|
| G06N 20/00 | (2019.01) | |
| G06Q 50/26 | (2012.01) | |
| G06Q 10/10 | (2012.01) | |
| G06Q 10/06 | (2012.01) | |
| G06Q 10/0637 | (2023.01) | |

(52) U.S. Cl.
CPC ......... *G06N 20/00* (2019.01); *G06Q 10/0637* (2013.01); *G06Q 10/10* (2013.01); *G06Q 50/26* (2013.01)

(58) Field of Classification Search
CPC ......... G06N 3/00; G06N 20/00; G06F 17/243
See application file for complete search history.

(56) References Cited

U.S. PATENT DOCUMENTS

| | | |
|---|---|---|
| 7,739,693 B2 | 6/2010 | Bernhard et al. |
| 7,831,734 B2 | 11/2010 | Bernhard et al. |
| 8,060,487 B2 | 11/2011 | Schmidt-Karaca |
| 8,407,297 B2 | 3/2013 | Schmidt-Karaca et al. |
| 8,572,369 B2 | 10/2013 | Schmidt-Karaca et al. |
| 8,604,973 B2 | 12/2013 | Schmidt-Karaca et al. |

(Continued)

FOREIGN PATENT DOCUMENTS

WO    WO-2016170368 A1 * 10/2016 ............. G16H 10/60

OTHER PUBLICATIONS

Kuang Chen, Harr Chen, Neil Conway, Joseph M. Hellerstein, Tapan S. Parikh, "USHER: Improving data quality with dynamic forms", 2010 IEEE 26th international conference on data engineering, pp. 321-332 (Year: 2010).*

(Continued)

*Primary Examiner* — Brian M Smith
(74) *Attorney, Agent, or Firm* — Klarquist Sparkman, LLP

(57) ABSTRACT

Methods, computer-readable media and systems are disclosed for building, deploying, operating, and maintaining an intelligent dynamic form in which a trained machine learning (ML) model is embedded. A universe of questions is associated with a plurality of output classifiers, which could represent eligibilities for respective benefits. The questions are partitioned into blocks. Each block can be associated with one or more of the classifiers, and each classifier can have a dependency on one or more blocks. An ML model is trained to make inferences from varied combinations of responses to questions and pre-existing data, and determine probabilities or predictions of values of the output classifiers. Based on outputs of the trained model, blocks of questions can be selectively rendered. The trained model is packaged with the question blocks and other components suitably for offline deployment. Uploading collected responses and maintenance of the dynamic form are also disclosed.

20 Claims, 12 Drawing Sheets

(56) References Cited

U.S. PATENT DOCUMENTS

| | | | |
|---|---|---|---|
| 8,713,560 | B2 | 4/2014 | Neumann et al. |
| 9,183,542 | B2 | 11/2015 | Schmidt-Karaca |
| 9,262,763 | B2 | 2/2016 | Peter et al. |
| 9,934,213 | B1* | 4/2018 | Dutt ..................... G06Q 40/00 |
| 2003/0023657 | A1 | 1/2003 | Fischer et al. |
| 2003/0037254 | A1 | 2/2003 | Fischer et al. |
| 2003/0046017 | A1 | 3/2003 | Fischer et al. |
| 2003/0046448 | A1 | 3/2003 | Fischer et al. |
| 2003/0055927 | A1 | 3/2003 | Fischer et al. |
| 2003/0056207 | A1 | 3/2003 | Fischer et al. |
| 2004/0177361 | A1 | 9/2004 | Bernhard et al. |
| 2004/0199611 | A1 | 10/2004 | Bernhard et al. |
| 2004/0230670 | A1 | 11/2004 | Schmidt-Karaca et al. |
| 2005/0289350 | A1 | 12/2005 | Schmidt-Karaca et al. |
| 2007/0027866 | A1 | 2/2007 | Schmidt-Karaca et al. |
| 2008/0082575 | A1 | 4/2008 | Peter et al. |
| 2009/0106371 | A1* | 4/2009 | Schmidt-Karaca ......................... G06Q 10/107 709/206 |
| 2009/0106372 | A1 | 4/2009 | Schmidt-Karaca et al. |
| 2009/0276377 | A1* | 11/2009 | Dutta .................... G06Q 30/02 706/12 |
| 2010/0121924 | A1 | 5/2010 | Schmidt-Karaca et al. |
| 2011/0145571 | A1 | 6/2011 | Schmidt-Karaca et al. |
| 2011/0154445 | A1 | 6/2011 | Schmidt-Karaca et al. |
| 2011/0295623 | A1* | 12/2011 | Behringer .............. G06Q 10/10 705/4 |
| 2012/0133553 | A1 | 5/2012 | Schmidt-Karaca et al. |
| 2012/0136839 | A1 | 5/2012 | Eberlein et al. |
| 2013/0166417 | A1 | 6/2013 | Pulkowski et al. |
| 2013/0167135 | A1 | 6/2013 | Neumann et al. |
| 2013/0326464 | A1 | 12/2013 | Hermanns et al. |
| 2016/0232457 | A1* | 8/2016 | Gray ..................... G06T 11/206 |
| 2017/0185904 | A1* | 6/2017 | Padmanabhan ......... G06F 16/00 |

OTHER PUBLICATIONS

Alexander Tallroth, Max Alander "The Use of Machine Learning Algorithms for Adaptive Question Selection in Questionnaire-based Mental Health Data Collection Apps", Master's Thesis in Biomedical Engineering, Department of Biomedical Engineering, Lund University, Sweden, Jun. 21, 2016, pp. 1-77. (Year: 2016).*

Mwamikazi E., Fournier-Viger P., Moghrabi C., Baudouin R. (2014) A Dynamic Questionnaire to Further Reduce Questions in Learning Style Assessment. In: Iliadis L., Maglogiannis I., Papadopoulos H. (eds) Artificial Intelligence Applications and Innovations vol. 436. (Year: 2014).*

Mwamikazi, E. et al., "A dynamic questionnaire to further reduce questions in learning style assessment," Artificial Intelligence Applications and Innovations, vol. 435, pp. 224-235. (Year: 2014).*

Seet, A. et al., "An adaptive method for selecting question pools using C4.5," 10th IEEE Intl. Conf. on Advanced Learning Technologies (2010) pp. 86-88. (Year: 2010).*

Huang, S.-H. et al., "A decision tree approach to conducting dynamic assessment in a context-aware ubiquitous learning environment," 5th Intl. IEEE Conf. on Wireless, Mobile, and Ubiquitous Technology in Education (2008) pp. 89-94. (Year: 2008).*

Chen, K. et al., "Usher: improving data quality with dynamic forms," IEEE Trans. on Knowledge and Data Engineering, vol. 23, No. 8 (Aug. 2011) pp. 1138-1153. (Year: 2011).*

"Developer's Guide for SAP Business Objects Predictive Analytics integrator," retrieved from http://help.sap.com/businessobject/product_guides/pai11/en/pai11_developer_guide_en, on or before Jul. 13, 2016, 54 pages.

"Developer's Guide for SAP BusinessObjects Predictive Analytics integrator 1.1.1," retrieved from http://help.sap.com/businessobject/product_guides/pai11/en/pai11_developer_guide_en.pdf, document dated Oct. 25, 2016, 50 pp.

"Own Your Business Logic With Business Rules Framework plus," retrieved from http://go.sap.com/documents/2015/08/f69e0924-577c-0010-82c7-eda71af511fa.html, 2010, 77 pages.

"SAP Fiori® User Experience—SAP S/4HANA—Architecture Deep Dive," retrieved https://experience.sap.com/documents/sap-fiori-ux-architecture-for-s4h, on or before Jan. 20, 2016, 62 pages.

"SAP HANA Predictive Analysis Library (PAL)," retrieved from http://help.sap.com/hana/sap_hana_predictive_analysis_library_pal_en, on or before Sep. 13, 2016, 578 pages.

"SAP Predictive Analytics & HANA Unified Model Management," asug 25 Years of Disruption, retrieved from http://help.sap.com/hana/sap_hana_predictive_analysis_library_pal_en, on or before 2016, 10 pages.

"What is PAL?" retrieved from http://help.sap.com/saphelp_hanaplatform/helpdata/en/c9/eeed704f3f4ec39441434db8a874ad/content.htm, 2014, pp. 1-3.

Barzewski, Alfred, "Introduction to Business Object Processing Framework (BOPF)," retrieved from https://archive.sap.com/documents/docs/DOC-45425, on or before Mar. 15, 2016, pp. 1-4.

Dowling, Kelly, "5326—Interactive ASUG Influence: Predictive Analytics Integration with SAP HANA Unified Model Management," retrieved from https://discuss.asug.com/docs/DOC-44785, on or before May 25, 2016, 1 page.

Hillenbrand, Thea, "E2E: BOPF-SADL-GW-SAPUI5—Introduction," retrieved from https://blogs.sap.com/2015/02/12/e2e-bopf-sadl-gw-sapui5-introduction, 2015, pp. 1-15.

\* cited by examiner

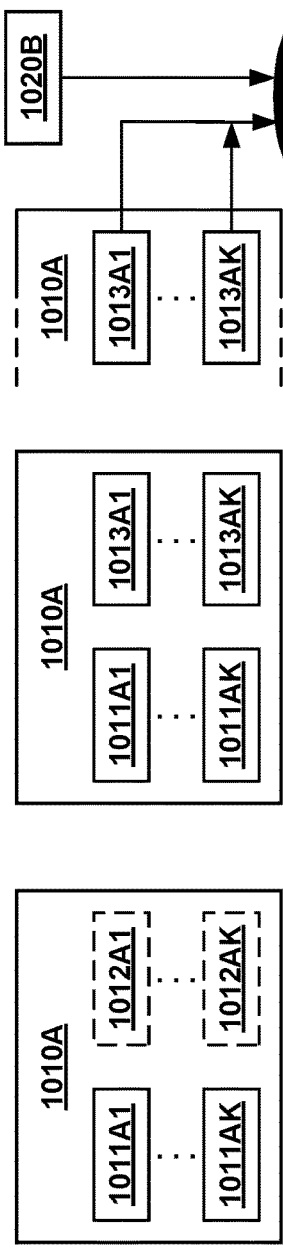
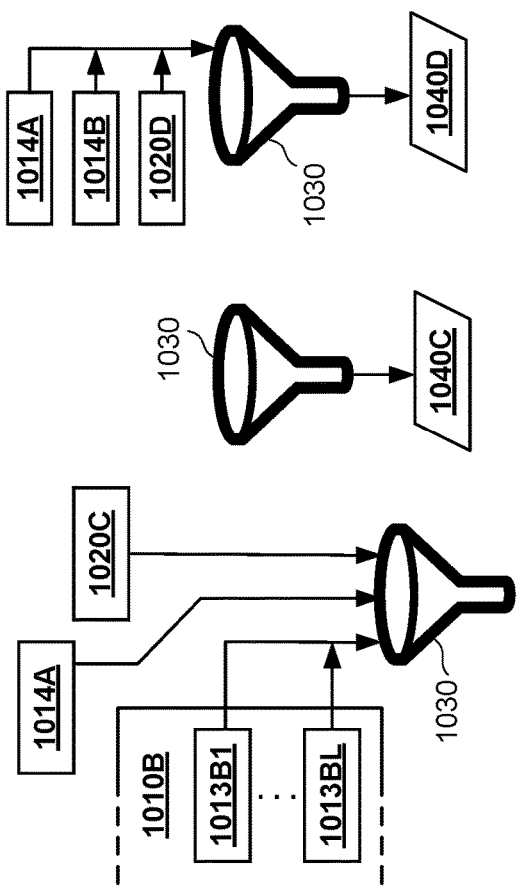

DYNAMIC FORM WITH MACHINE LEARNING

BACKGROUND

Forms are widely used throughout modern society for interactions between government agencies, businesses, software applications, and individuals. Common problems encountered by users include redundancy, lack of awareness, and inefficiency. Redundancy may arise when the same data must be entered on multiple forms, or when data is required to be entered even when it is already known by a requester. Lack of awareness may arise when a user is unaware of the forms relevant for his situation. Inefficiency may arise through redundancy, but also through wasting time and effort filling in irrelevant forms, and through government, business, or software processes where filling in a first form at a first stage of a process leads, after some delay, to a second form that must be filled out at a second stage, and so forth.

Common problems encountered by administrators include development cost and maintenance cost. Efforts to improve efficiency by ferreting out commonalities and relationships between forms may be tedious and expensive, and are prone to human error. The cost of maintaining large numbers of forms may be high, and may be particularly high when changing rules and requirements for one form leads to impacts on other forms.

Particularly, in the case of government agencies providing social protections, an agency may provide tens or even hundreds of different benefits to end users. For each benefit, an eligibility decision can be made based on the knowledge of a set of data defining the end user's circumstances. First, the data has to be collected or provided by the end user, then a decision can be made. Often this phase of data retrieval happens in many roundtrips, because it is not known up-front which benefits an end user might want to apply for and when the picture becomes clearer additional data has to be requested.

This is tedious for the end user and also it is a huge effort to implement forms individually for each benefit with the specific data needed for a particular benefit. It also often happens that the same data has to be requested several times because different benefits require same data.

Similar problems arise in many other areas, including taxation, applications for colleges and scholarships, and certain software, business, and regulatory use cases involving validations across multiple requirements. Thus, there is a need for improved technologies for developing, using, and maintaining forms.

SUMMARY

In summary, the detailed description is directed to various innovative technologies for developing, using, and maintaining forms. Examples of disclosed technologies use machine learning (ML) techniques to make predictions regarding the applicability of questions in forms, thereby streamlining the user experience without requiring costly attention by developers to individual details. Examples of disclosed technologies permit ready integration and maintenance of a large number of forms, with great savings in administrative and development effort.

Examples of disclosed technologies are based on a universe of questions pertaining to a plurality of forms. The questions can be organized in blocks, dubbed form blocks. The blocks of questions and the forms are associated with outcomes, which could be, for example, eligibility of an end user for a particular benefit. Each form and each form block can be associated with one outcome, or with a plurality of outcomes. Using these form blocks, a dynamic questionnaire is built that in principle is able to request possible data required to determine a range of possible outcomes. It adapts to the users' needs dynamically. Only relevant questions are displayed. The assessment on relevance is performed with ML based predictive models based on the answers given in previous questions and/or on data provided by the end user earlier or otherwise known about the end user.

According to one aspect of the innovations described herein, an ML model is trained using training data which associates input data with output classifications associated with form blocks. The ML model can implement any of a wide range of techniques, such as a Bayes classifier, a decision tree, logistic regression, a model ensemble, multinomial logistic regression, a neural network, a random forest, and/or a support vector machine. The trained ML model is incorporated into a predictive module, which is configured to map input data values at runtime to parameters associated with output classifications. The input data values can be responses to previously rendered form blocks, and in some examples can also include pre-existing data regarding the end user. In some examples a parameter can be a prediction of an output classification value, for example, "eligible" or "ineligible", while in other examples a parameter can be a probability of an output classification value. The predictive module can be implemented in any of a variety of languages, such as JavaScript, Dart, or WebAssembly. A decision module is configured to receive the parameters associated with output classifications from the predictive module, and to determine whether a subsequent form block is to be rendered. A dynamic form is built by packaging form blocks, the predictive module, and the decision module.

In certain examples, the dynamic form is deployed to a client device, such as a mobile device, for offline use. In other examples, the dynamic form is accessed remotely over a web interface. In still other examples, components of the dynamic form can be organized into a plurality of packages in order to cooperatively implement disclosed innovations.

In a second aspect, the dynamic form is maintained by acquiring additional training data, performing further training of the ML model with the additional training data, and updating the predictive module with the updated trained ML model. In certain examples, these updates can include one or more additional form blocks and/or one or more additional output classifiers. An updated dynamic form can be deployed to a client device, either by push, or in response to a request.

In a third aspect, the described innovations can be in the form of computer-readable media comprising instructions for implementing one or more of the above procedures. The computer-readable media can further comprise instructions for receiving form blocks, for receiving training data, and/or for implementing a module that receives input responses from form blocks from a client device. In some examples, these instructions can be part of a server application.

In a fourth aspect, a succession of form blocks of a dynamic form is selectively rendered on a client device. Following rendering of a first block of questions in a graphical user interface, and receipt of associated responses, a predictive module is invoked based at least partly on responses to the first block of questions, to obtain a parameter associated with an output classification associated with a second block of questions. The predictive module can also apply pre-existing end user data, as well as responses to other blocks of questions. In some examples, the parameter can be a predicted value of the output classification, while in other examples the parameter can be a probability of an output classification value. Based on this parameter, a decision module determines whether to render the second block of questions in the graphical user interface. As previously described, the predictive module can implement a trained ML model that was trained using one or more of a variety of ML constructs. In certain examples, the rendering of the dynamic form is self-contained on a mobile or immobile client device. The procedures for rendering the dynamic form can also be distributed between a client device and one or more server devices, for example, the rendering of form blocks can be performed on the client, while the predictive module and the decision module can be hosted server-side. Client-server interaction can be through a Web browser or through another networking technology.

In a fifth aspect, the described innovations can be in the form of computer-readable media comprising instructions for implementing one or more of the above procedures, such as rendering form blocks, invoking the predictive module, or determining whether following form block(s) should be rendered. The computer-readable media can further comprise instructions for receiving a dynamic form package, or for transmitting collected form responses to a host server. In some examples, these instructions can be part of a client application.

In a sixth aspect, the described innovations can be part of a system. An innovative system can be a server-side system including a computing system and a server application. An innovative system can be a client-side system including a computing system and a client application. An innovative system can combine partially or wholly a server-side system and a client-side system, and can also include portions resident in a computing cloud.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 10A-10I depict an exemplary scenario involving a dynamic form according to disclosed technologies.

DETAILED DESCRIPTION

Example Problem Environment

An exemplary problem environment will be described in the context of application for government administered benefits, sometimes dubbed social protection. In this problem environment, a multiplicity of separate determinations is sought to be made regarding eligibility for various benefit programs. Eligibility determinations are made on the basis of an end user's circumstances, dubbed circumstance data, or simply end user data. Conventionally, each benefit determination involves independent collection of associated data, typically on respective forms or equivalents. In the conventional way, 100 benefits having forms of 50 questions each require gathering 5000 pieces of information. However, owing to redundancy, there may be only 1000 separate data items required to complete all 100 forms. The totality of 1000 data items is sometimes known as the circumstance data model, describing all relevant aspects of an end user's circumstances. Each data item can be mapped to an associated question requesting this data item. Accordingly, there is a universe of 1000 questions for this exemplary problem domain.

Figure 1:
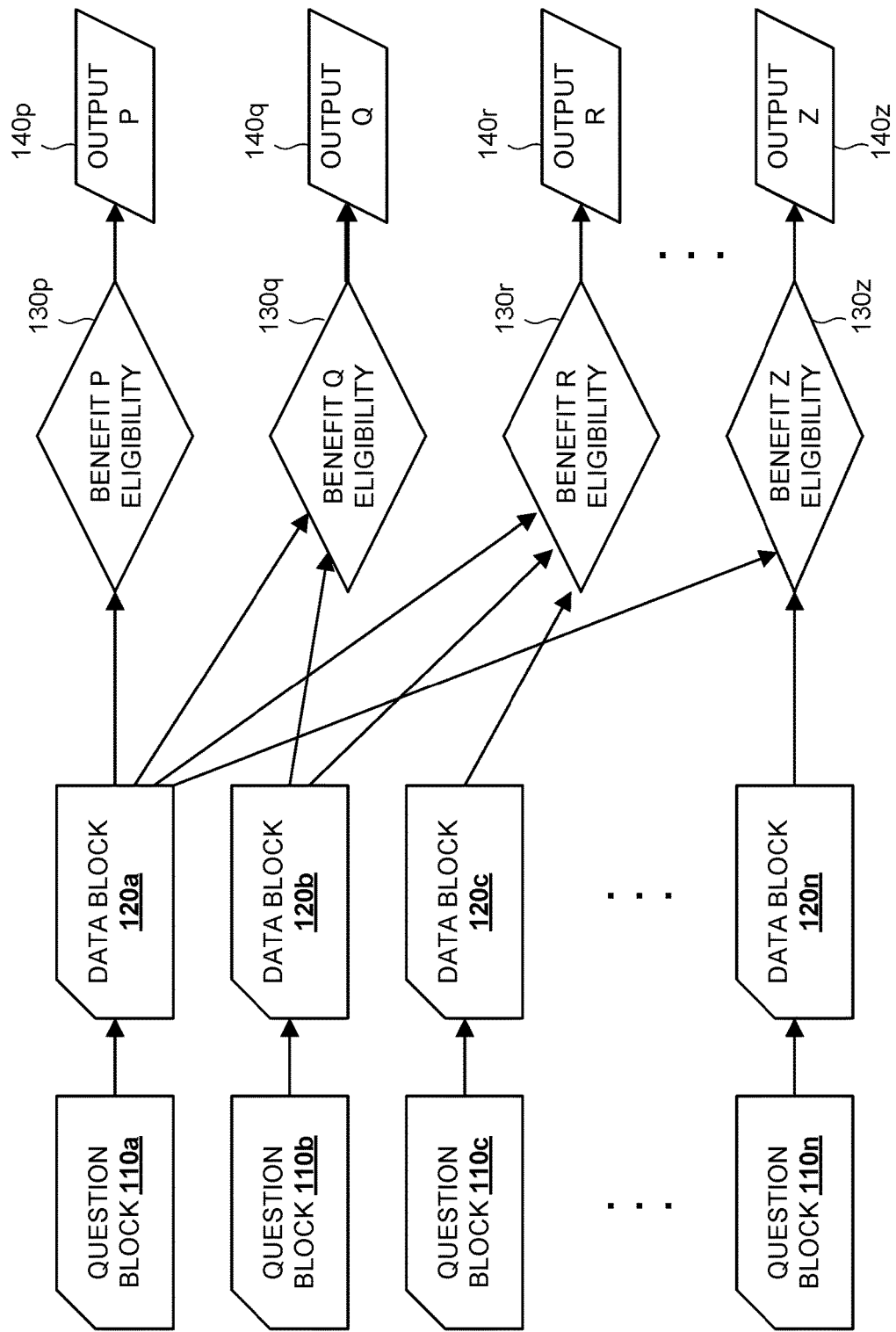
FIG. 1 is a diagram depicting an exemplary relationship between question blocks, data blocks and output classifications.

Then, the universe of questions (or equivalently, data items) can be grouped in blocks. FIG. 1 is a diagram depicting an exemplary relationship between question blocks, data blocks, and output classifications. Blocks 130*p*-130*z* represent the decision making processes for Benefits P-Z respectively. Question blocks 110*a*-110*n* represent the universe of questions, grouped in blocks. That is, the union of question blocks 110*a*-110*n* is the universe of questions. Each question block corresponds to a respective data block containing the end user data items for respective questions. The union of data blocks 120*a*-120*n* is the circumstance data model, or universe of data items. In certain examples, data blocks 120*a*-120*n* are disjoint, that is, no data item is repeated among the data blocks, but this is not a requirement of the disclosed innovations: in other examples, there may be some repetition of data items, albeit at the possible cost of inefficiency.

As indicated by the lone arrow leading into eligibility decision block 130*p*, all data items required by this decision block 130*p* are contained in data block 120*a*. Whereas eligibility decision block 130*r* requires all of data blocks 120*a*-120*c*. Eligibility decision blocks 130*q* and 130*s* require two data blocks each, as indicated. Once eligibility decision block 130*q* has the data items required (in this example, the responses to question blocks 110*a*-110*b*), decision block 130*q* can produce output 140*q*, which can have one of two values: "eligible" and "ineligible." It should be noted that, in certain situations, not all the data items required by decision block 130*q* may be available. In some examples, this case can be handled by providing a default value for output 140*q*, for example, "ineligible."

In this problem environment, the disclosed innovations take advantage of the fact that not all question blocks may need to be presented to an end user. For example, the responses of a particular end user to question block 110a could be sufficient to decide that the particular end user is ineligible for Benefit Z, and thus data block 120n is not required and question block 110n need not be presented. As another example, the responses to question block 110a could be sufficient to determine eligibility for Benefit Q, suggesting the possibility that question block 110b could be skipped. However, if eligibility for Benefit R is as yet unsure, then it could still be necessary to collect data block 120b, by presenting question block 110b to the end user. The disclosed innovations address the selective presentation of question blocks dynamically, using a trained machine learning (ML) model, as will be described further below.

The discussion thus far has not addressed the issue of how to group the universe of questions into blocks. There are many ways to do this. While detailed discussion and analysis of alternatives are beyond the scope of this disclosure, one simple technique is now presented.

Questions in the universe can be grouped according to the dependencies of the eligibility decision blocks 130p-130z. Thus, question block 110n contains all questions that impact Benefit Z eligibility but do not impact any other eligibility decision. Similarly, question block 110c contains all questions that impact Benefit R but do not impact any other eligibility decision, question block 110b contains all questions that impact Benefits Q and R but do not impact any other eligibility decision, and question block 110a contains all questions that impact all of Benefits P-Z. As a refinement of this technique, preliminary groupings can be consolidated to reduce the number of question blocks. For example, question blocks 110c and 110n could be consolidated into a single question block containing all questions that impact eligibility for at least one of Benefits R and Z, but do not impact any other eligibility decision.

While the problem environment has been described in the realm of social protection, one of ordinary skill in the art will appreciate that similar problem environments can also be encountered in other domains. Accordingly, the disclosed innovations are not limited to government administered benefit programs, but are broadly applicable.

Overview of an Example Dynamic Form

An offline dynamic all-purpose form implements some of the logic described above and dynamically adapts to the end user's data and needs. Only relevant question blocks are displayed. The assessment on relevance is performed with ML based predictive models based on the answers given in previous question blocks or data that the end user had provided earlier, or that may be otherwise known about the end user. The dynamic form can be used as part of a social protection platform. It can replace existing procedures for determining eligibility, or it can support existing procedures by efficiently collecting circumstance data and providing an implicit pre-eligibility check.

Four aspects of the dynamic form are described: design, predictive modeling, pack-and-go, and client-side operation.
1. Design The circumstance data model is loaded into a design time tool, and the questions (corresponding to the respective data items) are created and grouped into blocks, known as question blocks or form blocks. The collection of form blocks is dubbed a master questionnaire. There is a 1:1:1 binding between a question, an input field of a form block, and a data item of the circumstance data model. The input fields may be labeled with question text or prompts, and may additionally have help text or screen tooltips to guide the end user to correctly provide the sought data item.

For each question block a stub for an ML model is also created. The stub consists of an input data vector comprising all circumstance data elicited from current and previously displayed form blocks, as well as a freely definable data set describing the end user. The latter can contain pre-existing end user information, as well as data whose purpose is to identify the end user and the current data vector.
2. Predictive Modeling After designing the question blocks and stubs for the ML model, using the design time tool, ML can be performed. Training of a ML model can be supervised, unsupervised, or semi-supervised, which in some examples denotes unsupervised ML subject to constraints. The target values for the ML model are predictions whether the end user will or will not be eligible for the various benefits. In some examples, probabilities of eligibility outcomes can be used as a proxy for binary eligibility predictions, where insufficient end user data or insufficient training data is available. In some examples, the target values can include estimates or predictions of relevance for upcoming form blocks.

The model is trained using circumstance data for end users where the eligibility status for one or more benefits is already known. A wide range of ML algorithms are available for training, using such basic techniques as a Bayes classifier, a decision tree, logistic regression, a model ensemble, multinomial logistic regression, a neural network, a random forest, and/or a support vector machine. These algorithms may be implemented through one or more commercially available or freely available libraries or packages. In some examples, the training algorithms iteratively try best cut-off values for the output classifiers (eligibility values) to achieve optimal segmentation between end users for whom a question block is relevant and those end users for whom the question block is not relevant. In other examples, segmentation is sought between end users having output classifier estimations of, for example, "eligible," "ineligible," or "indeterminate."

In some examples, SAP's automated predictive libraries and the UMML (Unified Model Management Layer) or PAI (Predictive Analytics Integration) can be employed to fully automate the model training. In other examples, other similar libraries and technologies can be used. In this way, data acquired from a growing end user base and knowledge of their eligibility decisions can be used to continuously or periodically augment training and refinement of the ML model. Updates based on the circumstance data model and the historic eligibility decisions can be used to schedule automated regeneration and updates of the ML model. Model retraining can be performed on a partial basis, for example, for only some form blocks or for only some output classifiers. Over the lifetime of the dynamic form, form blocks and output classifiers can be added, deleted, or modified in various ways.

The model itself can be implemented as a JavaScript function (if the chosen implementation language happens to be JavaScript) and stored at a server after training, for incorporation into a packaged dynamic form.
3. Pack and Go The form blocks and the trained ML model are stored at a server, and packaged together prior to deployment. In some examples, doing the packaging on a just-in-time basis is advantageous because it ensures that the freshest (most up-to-date) ML model is deployed. Updates of the dynamic form can be part of a lifecycle management program: whenever the ML model is retrained, a new version of the dynamic form can be created at the back-end server.

In some examples, packaging of the dynamic form can be end user-specific and can include pre-existing end user data within the dynamic form package. In other examples, the dynamic form is only updated periodically or infrequently. In some such examples, an interface can be provided so that the dynamic form can access separately provided pre-existing end user data.

Deployment can occur directly by end user access, for example, when the end user loads an app onto a phone or tablet via a web browser or an app store. In some examples, the end user launches the app, and the pack-and-go happens while loading the complete content during the initialization of the application. For deployment to a browser, JavaScript functions for the ML model are packed as part of the application code shortly before the application gets deployed or loaded into the client's web browser.

In other examples, deployment can occur under control of the deploying agency. For example, a government case worker may request deployment of the dynamic form to a mobile device to be carried on an end user visit. The most recent versions of the form blocks and the trained ML model can be deployed as content of the questionnaire or dynamic form app. If the case worker has specified an end user, the end user data can also be pre-loaded to the client device. Pre-loaded end user data can significantly enhance the efficiency of the dynamic form and enhance the end user experience. However, pre-loaded end user data is not a requirement of the disclosed innovations; in some examples, the dynamic form is operated "fresh," without any pre-existing end user data; "fresh" operation can be advantageous in some circumstances, where there is a risk of pre-existing data being stale. In other examples, pre-existing data is available or present, but is still not used, by choice of the end user, by choice of the case worker, or because of failure to validate the end user.

4. Client-Side Operation

The deployed dynamic form can be executed in an offline mode. Particularly, dynamic form components in JavaScript can be executed within a web browser. At this stage, the dynamic form incorporates a trained ML model, but no ML algorithms are being performed, because the algorithms were already used to develop the trained model during the training procedure. Thus, offline execution of the dynamic form is straightforward and can be performed without any server support. Particularly, the dynamic form can be executed within a browser and without any network connection. Offline operation, without any network or server round-trips, can significantly speed up the operation of the dynamic form, and thereby enhance the end user experience.

The dynamic form consists of question blocks that together comprise and are equivalent to the master questionnaire. At the beginning of a question block, the form will dynamically decide whether the question block is to be displayed or hidden. The decision uses a predictive model which classifies the next block as relevant or not. A block is not relevant if all associated output classifications are already determined. The input data for the predictive model consist of the questions that have been answered already in previous blocks and can also include data about the end user which was available before the questionnaire was begun.

In some examples where pre-loaded end user data is used, the associated questions and input fields can be hidden from view, even within form blocks that are rendered on a graphical display. Hiding of such fields can be performed dynamically while executing the dynamic form, or the fields can be hidden during end-user-specific packaging of the dynamic form (together with pre-existing end user data) at a server, prior to deployment. In other examples, pre-existing data is not hidden, but is displayed to the end user, thereby offering an opportunity to correct erroneous data or to update stale data.

Definitions

As used in this disclosure, a form is a combination of instructions and data for exchanging information with an end user. The dynamic form of the disclosed innovations is a form. Questions or prompts from the form are provided to the end user, and responses to those questions or prompts are received from the end user in input fields of the form. The questions of a form may be apportioned into groups dubbed form blocks or question blocks; the responses are data items that are correspondingly grouped into data blocks. As used in this disclosure, the terms circumstance data, data items, data blocks, and pre-existing data are associated with context and represent information about an end user. Data items can have definite single values, including numerical, logical, or text, and can also take meta-values such as "unknown," and further can be specified as a range of values or a set of values.

The term end user is used in this disclosure to refer to any entity for whom or for which entries in the form provide circumstance data. The end user can be any individual, and need not have a transactional relationship with any other party to the form. In some examples, the end user may be an organization, including a business or a government entity. The term agency is used to refer to an entity that provides a dynamic form according to the disclosed innovations, or that controls the form, or that receives or controls data items gathered through use of the form. The operation of the form may be done independently by an end user, or may be done in conjunction with a representative of the agency, who is dubbed an agent.

As used in this disclosure, a question is an element of a form associated with an input field for the purpose of eliciting a response that is a particular data item. A question can be any prompt, whether textual or graphical, and need not literally be presented with a question mark. An input field is an element of a form which provides a means for entry of a data item. For example, an input field can be a text box, a drop-down list, or a set of one or more radio buttons. An input field can be presented blank or with a pre-populated or default entry, and can be programmatically restricted to accept only qualified entries, such as those offered in a drop-down list, or those satisfying a regular expression, lexical, numerical, or other validation criterion. A question and input field can be integrated as a single visual entity, for example, a labeled button.

As used in this disclosure, the term machine learning (ML) refers to any technology that enables computers to learn, identify patterns, make predictions, probability estimates, or other determinations without being explicitly programmed with an associated rule. An ML project commonly includes a model, an algorithm, and training data. The model is a malleable combination of software and data configured to receive inputs from the project domain and generate desired outputs. The training data provides records having inputs and known outputs. The algorithm is chosen in conjunction with the model and uses the training data to train the model. Through application of the algorithm, the model is trained, thereby learning to identify patterns, make predictions, probability estimates, or other determinations. Prior to training, outputs from the model can be unreliable, and could be default values or random values. Through training, the reliability of the model outputs is increased, which can be verified through testing.

An Example Server Method

Figure 2:
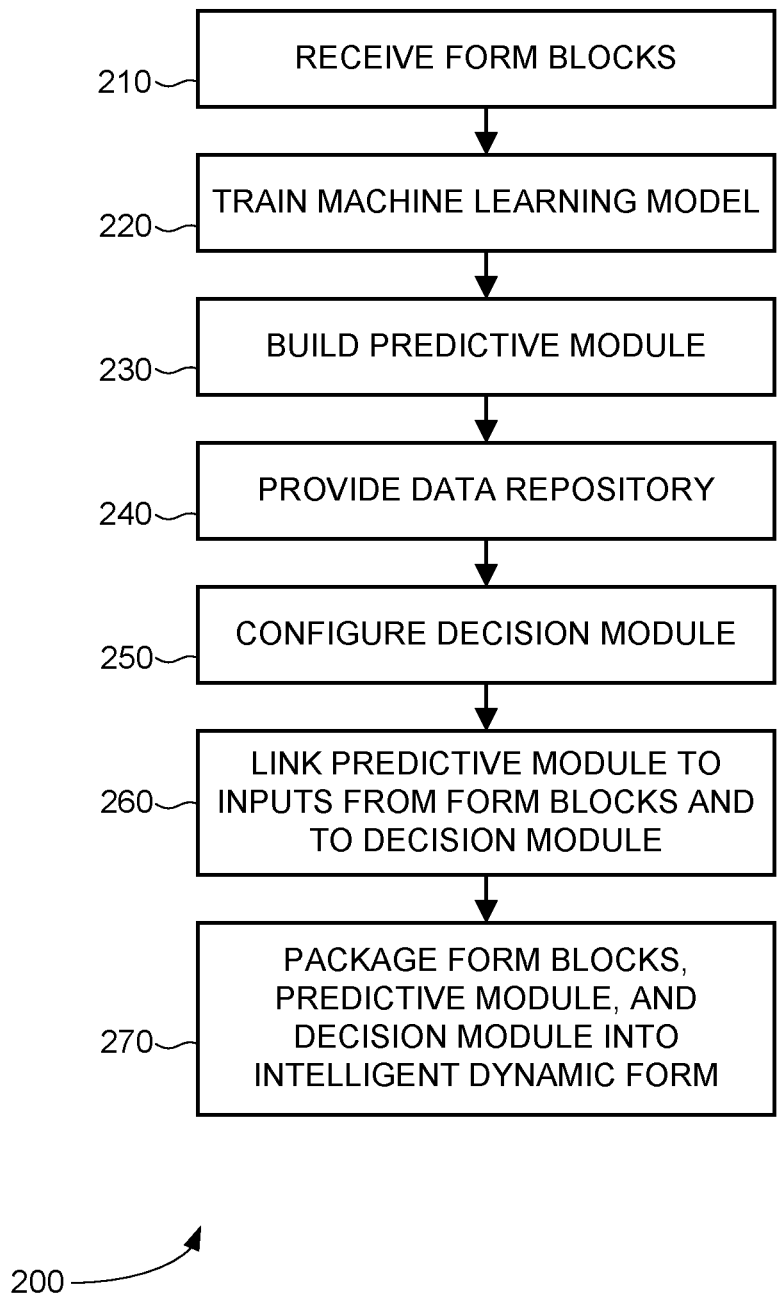
FIG. 2 is a flowchart of a method for building a dynamic form according to disclosed technologies.

FIG. 2 depicts a flowchart 200 illustrating a method for building a dynamic form according to disclosed technologies. At process block 210, form blocks are received. Each form block comprises one or more questions designed to elicit information required to determine a desired output classification.

At process block 220, an ML procedure is performed. A corpus of training data is used to train an ML model. The training data comprises a plurality of records for a range of end users, scenarios, questions, and output classifiers; each record contains an association between one or more end user circumstance data values and one or more output classifiers; different training records can contain different sets or subsets of data values and different output classifiers or parameters concerning output classifiers. Particularly, there is no requirement that the training records be uniform. While in some examples, training records can all contain the same populated input data fields and the same output classifier fields, in many other examples the training records can be heterogeneous providing different, and even vastly different, sets of input data, for the same or different output classifiers. Training records can contain input data fields that are empty or unknown, or can contain a range of values rather than a single value. For example, an input data field can specify age as "40-44 years", or income as "$40,000 to $60,000." A portion of data records separate from the training data can be used to test the trained model.

Training data can be obtained from prior history and knowledge of an end user base. Alternatively, training data can be constructed based on known rules for the output classifiers. Training data can also be obtained from earlier deployed versions of the dynamic form. The ML model can employ any one or more of a variety of ML techniques, including for example, a Bayes classifier, a decision tree, logistic regression, a model ensemble, multinomial logistic regression, a neural network, a random forest, and/or a support vector machine. Through the training procedure, the ML model learns to map subsets of end user circumstance data to output classifiers. The ML model can be trained to make predictions of output classifier values (e.g. end user ineligible for benefit X), or to estimate probabilities of output classifier values (e.g. 73% likelihood that end user is eligible for benefit Y), or to determine combinations of predictions and probabilities, or to directly estimate relevance of form blocks which have not yet been filled.

At process block 230, a predictive module is built from the trained ML model. In some examples, the trained ML model is incorporated intact into the predictive module, while in other examples the trained ML model is incorporated by translating the trained ML model into a collection of rules which are incorporated into the predictive module. The trained ML model (e.g., the rules) and/or the predictive module can be implemented using a browser-standard language such as JavaScript, Dart, WebAssembly, or any derivative, for ease of deployment in a browser environment. Alternatively, the predictive module can be implemented in ABAP or Java for deployment in a SAP environment, or in a general purpose computer language such as C, C++, C#, Cobol, Fortran, Java, Lisp, PL/SQL, Python, R, Visual Basic or any derivative, for standalone deployment or deployment in an Oracle environment. Particularly, a combination of languages can be used, for example, a function or library written in one language having an interface in, or ported to, another language.

The predictive module can provide different types of outputs, including a prediction of an output classifier value (e.g. "eligible" or "ineligible"), a probability of an output classifier value, or an indication that all output classifiers associated with a particular form block are determined (in which case that form block need not be rendered), or an indication that one or more output classifiers associated with a particular form block remain undetermined (in which case that form block should be rendered).

At process block 240, a data repository is provided. At run-time, form input data provided by an end user can be received by a form handler and stored in the data repository. In some examples, the data repository will be external to the dynamic form and accessed via an interface, while in other examples the data repository is integral to the dynamic form.

At process block 250, a decision module is configured, and at process block 260 the predictive module is linked to receive inputs from input fields of at least one of the form blocks and provide outputs to the decision module. The decision module is configured to receive the output classification parameters from the predictive module and make a determination whether one or more subsequent form blocks should be rendered to the end user. In some examples, some or all of the decision module logic can be integrated within the predictive module.

At process block 270, the form blocks, the predictive module, and the decision module are packaged together, along with other optional components, to produce a dynamic form. The other components can include the data repository, optionally including prior data pertaining to an end user. That is, in some examples, pre-existing end user data can be provided as part of the packaged dynamic form, so that the dynamic form is customized for a particular end user. In other examples, the packaged dynamic form does not itself include pre-existing end user data, so that pre-existing data is made available to a client separately from the packaged dynamic form, and the pre-existing end user data is linked to the dynamic form on the client prior to or at the beginning of an end user session.

The other components can also include a form handler, and a presentation manager linked to both form blocks and the decision module. The presentation manager is operable to cause a succession of form blocks to be selectively rendered on a graphical display under control of outputs from the decision module. In some examples, the presentation manager can directly control a graphical display unit, while in other examples, the presentation manager can indirectly control a graphical display unit through a browser interface. In still other examples, the presentation manager functionality can be partly or wholly distributed between the decision module and a browser or another stand-alone graphical software presentation module. The other components can include an input manager operable to receive responses to form blocks from an end user-accessible input device and store the responses in association with the form blocks for access by the predictive module, and for subsequent agency use. The dynamic form can be stored as a software module, as a compressed file, recorded onto a portable storage device such as a flash drive or an optical disk, or uploaded to a file server or a cloud repository for subsequent access and deployment.

One of ordinary skill in the art will recognize that the method described above can include further process blocks not shown in FIG. 2. Innovative examples can include process blocks for receiving training data, for configuring the ML model or the training procedure, for configuring the decision module, or for configuring deployment parameters of the packaged dynamic form.

An Example Server Application

Figure 3:
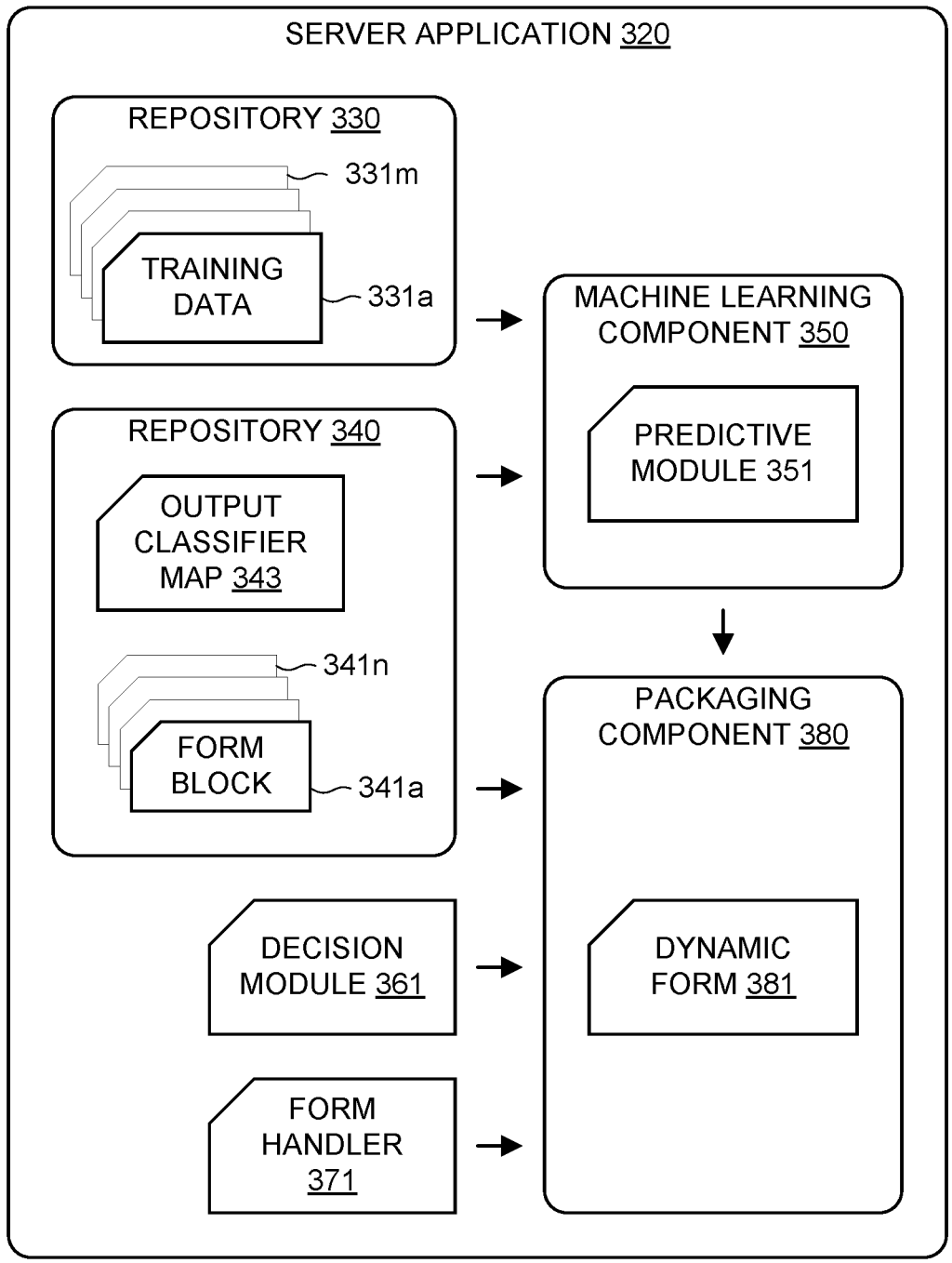
FIG. 3 is a block diagram of a server application according to disclosed technologies.

FIG. 3 depicts a block diagram of an exemplary server application 320 suitable for performing innovative features of the method of FIG. 2. Example server applications can be implemented as software and data on any of a variety of computing systems as described below, and can be instantiated from one or more computer-readable media containing the requisite processor-executable instructions.

Repository 330 contains a plurality of training data records 331a-331m. Repository 340 comprises a plurality of form blocks 341a-341n and, optionally, an output classifier map 343. The training data is connected as inputs to the ML component 350. Depending on the targets of the ML component 350 and the precise structure of training data records 331a-331m, data within repository 340 can also be provided as inputs to the ML component 350. The form blocks 341a-341n provide correspondence between questions (and their associated data items) and form blocks, while the output classifier map 343 provides correspondence between form blocks and output classifiers such as benefit eligibility. In some examples, the output classifier map can contain a representation of the relationships shown in FIG. 1 between data blocks 120a-120n and eligibility decision blocks 130p-130z. The ML component 350 trains an ML model and produces a predictive module 351 which incorporates the trained ML model. The predictive module 351, the form blocks 341a-341n, a decision module 361, and a form handler 371 are all connected as inputs to the packaging component 380, which constructs the dynamic form 381 therefrom.

In the form of computer-readable media, the disclosed innovations can incorporate instructions for receiving form blocks, for configuring an ML model, for receiving training data, for training the ML model using training data which associates values of one or more input data fields with corresponding values of the at least one output classification, and for building a predictive module from the trained ML model, wherein the predictive module is configured to receive at least one input data value and output one or more parameters associated with respective output classifications. The computer readable media can further include instructions for linking at least one form block with the predictive module so that values entered into input fields of the at least one form block are provided to the predictive module, for implementing a decision module configured to receive outputs from the predictive module and determine whether a next form block is to be rendered, and for building an intelligent dynamic form by packaging at least the plurality of form blocks, the predictive module, and the decision module. The computer-readable media can further comprise instructions for implementing a module that receives input responses from form blocks from a client device.

Example Server-Client Interactions

Figure 4:
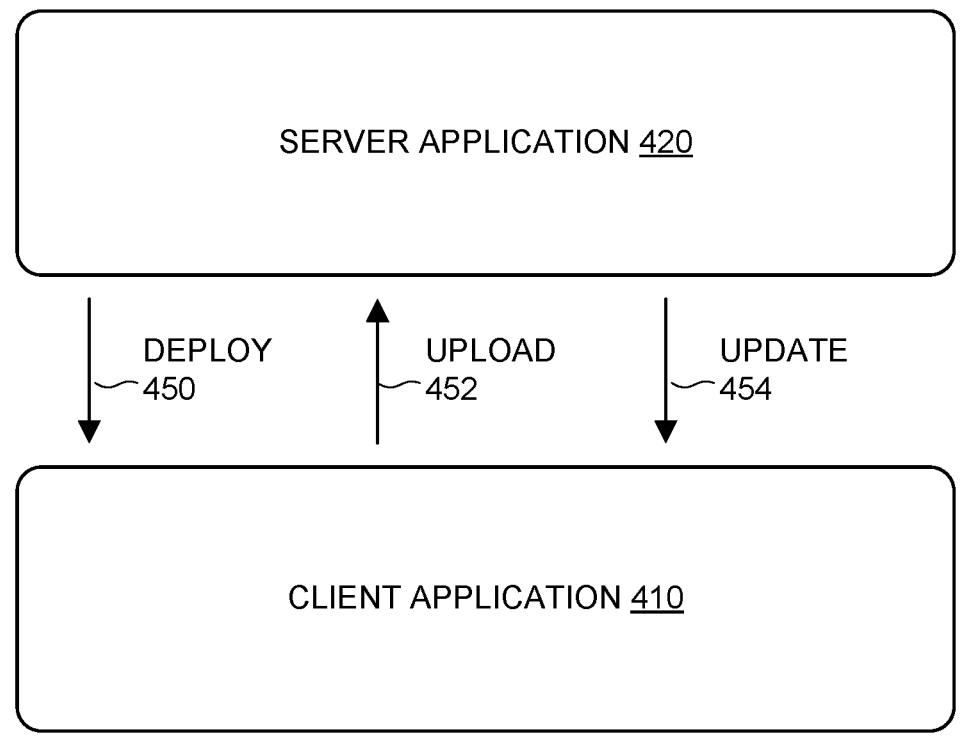
FIG. 4 is a diagram depicting interactions between a server and a client according to disclosed technologies.

FIG. 4 is a diagram generically depicting interactions between a server and a client according to disclosed technologies. A server application 420 can be similar to server application 320 described above. In some examples, server application 420 is responsible for building the dynamic form, as described above. Server application 420 can also be responsible for deploying the dynamic form, as shown by arrow 450, as one or more client applications 410. In various examples, client applications can be software objects, downloadable applications, browser-accessible web applications, or mobile device apps. Client applications 410 can be hosted on hardware devices such as mobile devices, stand-alone computers, workstations, virtual machines, or kiosks; clients can also be resident in a cloud environment. Client applications 410 operate the dynamic form, to render form blocks to an end user, acquire corresponding end user circumstance data as input by the end user, and determine some output classifications through operation of the predictive module within the dynamic form. The acquired data, and optionally the determined output classifications, can be uploaded to a server, as denoted by arrow 452. Server application 420 can also be responsible for maintaining the dynamic form and updating revised forms to various clients, as indicated by arrow 454. A particular client application 410 can participate in all three interactions represented by arrows 450, 452, and 454. In certain examples, a particular server application can also participate in all three interactions represented by arrows 450, 452, and 454. In other examples, the server functionality is specialized among a plurality of servers, so that a particular client 410 can interact with two or even three different servers for the deployment, upload, and update interactions. Over the lifetime of a dynamic form, client applications 410 can be introduced and removed from service; large numbers of client applications (hundreds, thousands, or even millions) can be in service at any given time. Similarly, server applications can be introduced, migrated, or removed from service. In certain examples, the number of active server applications will be much smaller than the number of active client applications, while in other examples, the number of active server applications can be comparable to or even exceed the number of active client applications.

Example Server-Client Handshake

Figure 5:
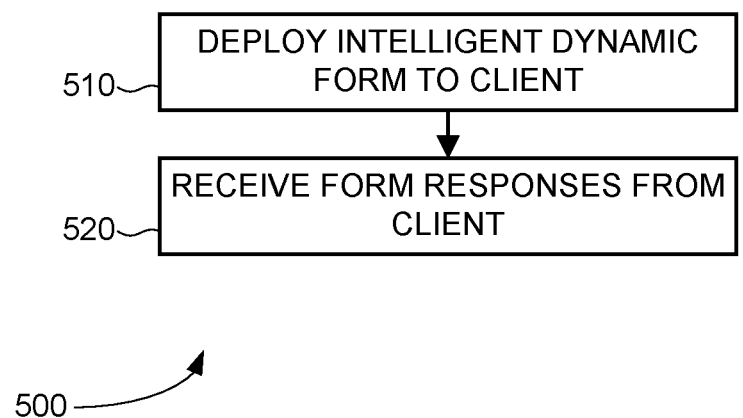
FIG. 5 is a flowchart of a method for interaction between a server and a client according to disclosed technologies.

FIG. 5 is a flowchart of a method for interaction between one or more servers and a client according to disclosed technologies, as seen from the server. At process block 510, a dynamic form according to the disclosed innovations is deployed as a client application to a client device. Subsequently, the client application engages with an end user, and acquires responses to one or more form blocks from the end user. As described above, the client application can also determine output classifiers for or from some of the form blocks. The client-end-user engagement can occur in an offline session. Then, at process block 520, the acquired responses, and optionally the determined output classifiers, are uploaded to a server. In certain scenarios, a plurality of end user engagements can take place between process blocks 510 and 520. In such examples, process block 520 can upload acquired data and/or determined classifiers one end user at a time (conceptually, row-wise), or according to form block or output classifier (conceptually, column-wise), or as a batch (conceptually, table-wise).

Example Maintenance of a Dynamic Form

Figure 6:
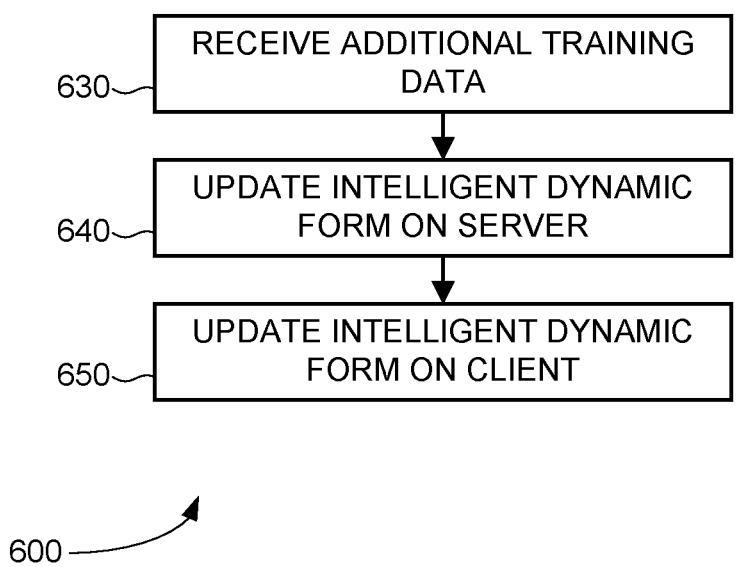
FIG. 6 is a flowchart of a method for updating a dynamic form according to disclosed technologies.

FIG. 6 is a flowchart of a method for updating a dynamic form according to disclosed technologies. At process block 630, additional training data is received. At process block 640, the ML model is updated by further training with additional training data. With the updated trained ML model, the predictive module (such as predictive module 351) and the dynamic form (such as dynamic form 381) can be correspondingly updated. At process block 650, the updated dynamic form can be deployed to one or more clients. It will be readily apparent to one of ordinary skill, in view of the preceding discussion, that the various procedures described in context of FIG. 6 can be implemented on a single server in some examples, or can be distributed among a plurality of servers in other examples. In further examples, some functions can be hosted in a cloud environment, or some functions can be provided by a third party.

In some examples, maintenance of the dynamic form does not involve any changes to form blocks or output classifiers, merely the predictive module is updated through additional training. The decision module can also be updated independently of updates to the trained ML model. In other examples, maintenance of the dynamic form can include addition of new form blocks, deletion of existing form blocks, reorganization of the form blocks, as well as changes to the output classifiers. For example, the dynamic form can be augmented with new form blocks for new benefits, or a form block having two output classifier states "eligible" and "ineligible" can be augmented with a third state "limited eligibility". In many examples involving changes to form blocks and output classifiers, maintenance of a dynamic form can involve renewing or updating training of the ML module.

Some or all of the functions described above can be embodied in one or more computer-readable media containing requisite processor-executable instructions.

A First Example Client Method

Figure 7:
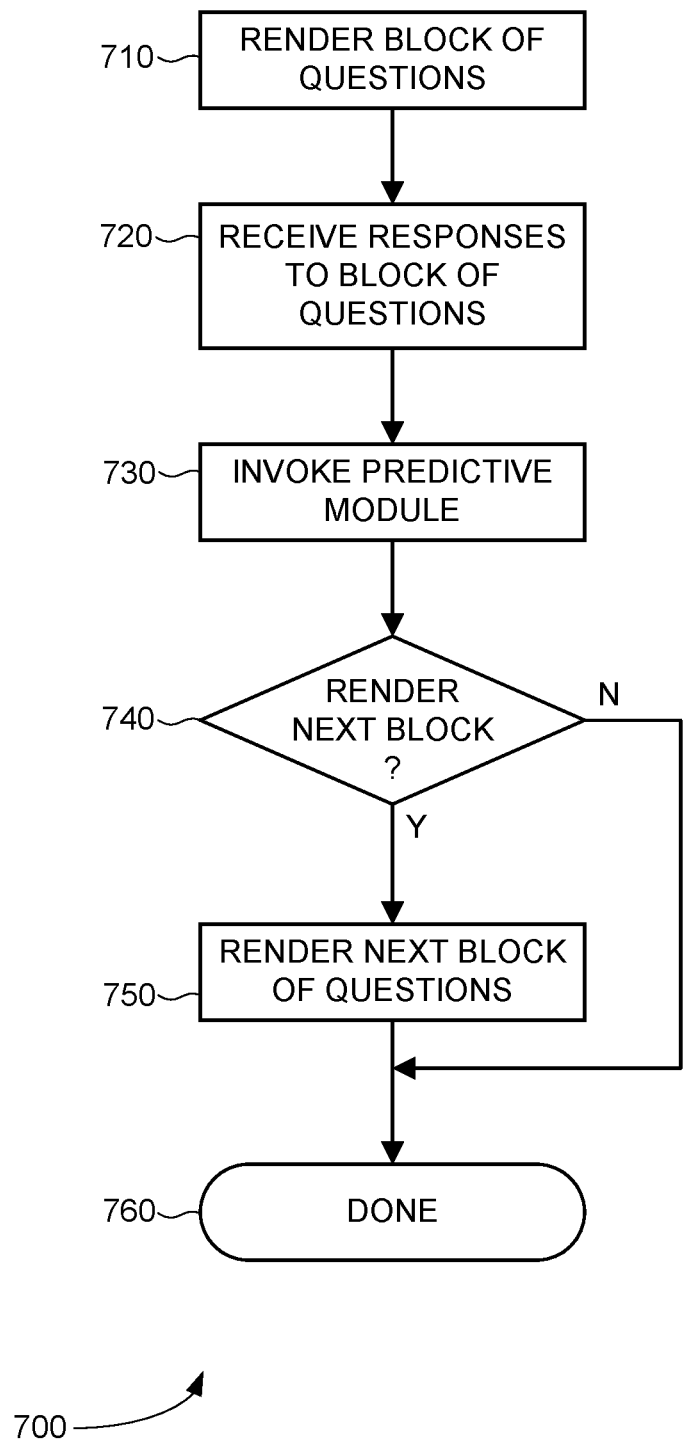
FIG. 7 is a flowchart of a method of operation of a dynamic form according to disclosed technologies.

FIG. 7 is a flowchart of a method of operation of a dynamic form according to disclosed technologies. In some examples this method can be performed on a client device, or by a client application. At process block 710, the client application or client device renders a block of questions on a graphical display device accessible to an end user. At process block 720, the client application or client device receives responses to all or a subset of the rendered questions. At process block 730, the predictive module within the dynamic form is invoked. Invocation of the predictive module causes the embedded trained ML module to process some or all of the available end user data in order determine one or more of a prediction, a probability, or another parameter associated with the output classifiers associated with one or more of subsequent form blocks. The available end user data can include any combination of response data received at process block 720, response data received from an earlier form block, response data received from the same end user in a previous session, or any other pre-existing data that can be known about the end user. At process block 740, a decision module uses output from the predictive module to determine whether an immediately following form block should be displayed. In the affirmative case, the flowchart proceeds to process block 750, and the immediately following form block is rendered to the graphical display device, and the method completes at process block 760. Otherwise, the "N" branch from process block 740 is followed, process block 750 is bypassed, and the method completes at process block 760. The method can be repeated for the next rendered block of questions, if any, in one or more successive iterations.

A Second Example Client Method

Figure 8:
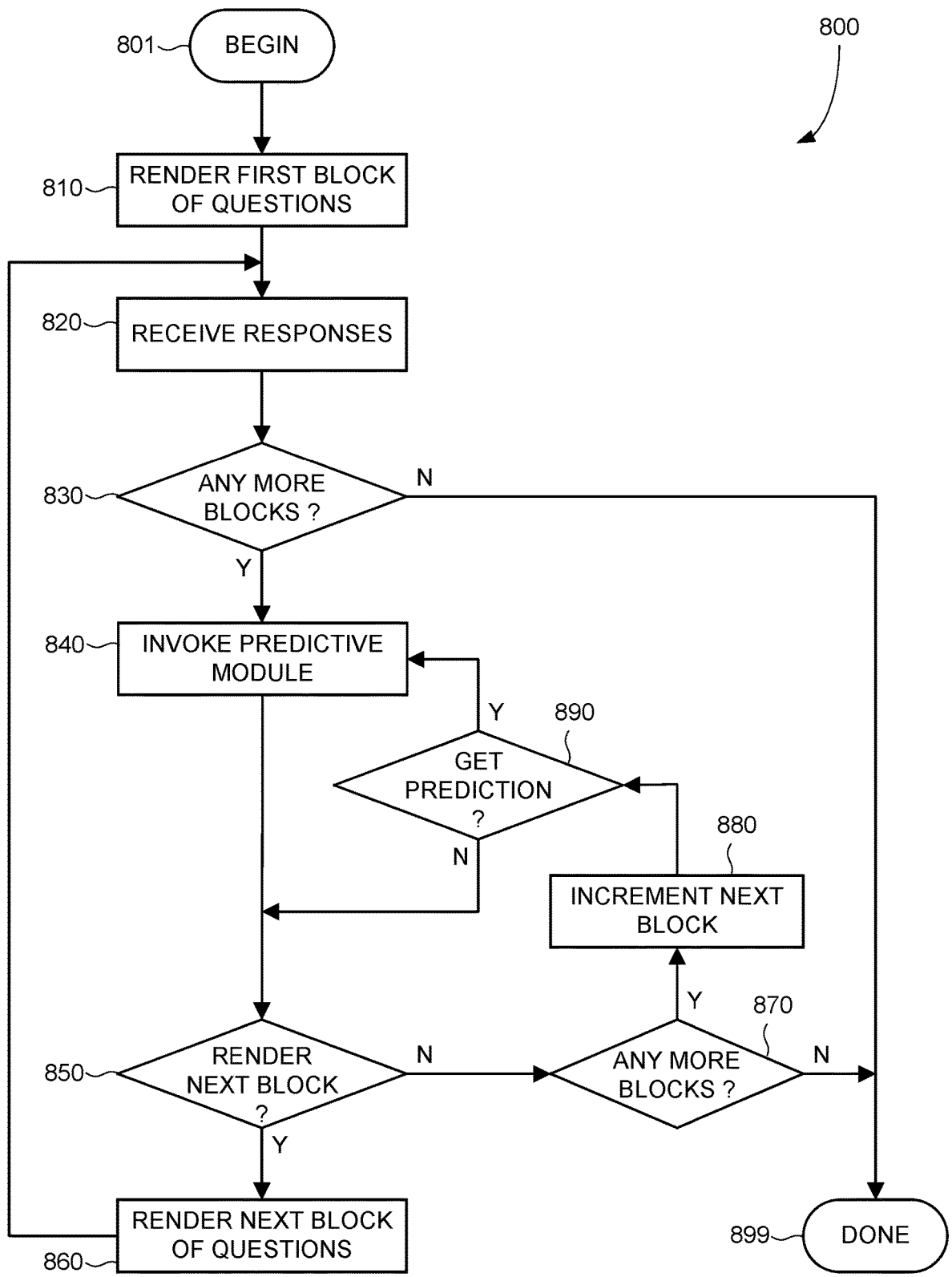
FIG. 8 is a flowchart of a method of operation of a dynamic form according to disclosed technologies.

FIG. 8 is a flowchart of another method of operation of a dynamic form according to disclosed technologies. The method begins at process block 801. At process block 810 a first block of questions is rendered to a display unit, and responses are received at process block 820, which are similar to process blocks 710 and 720 described above. At process block 830, the method checks if there are any more form blocks in the dynamic form to be traversed. If not, then the "N" branch from process block 830 is followed, leading directly to completion of the method at process block 899. Otherwise, the "Y" branch from process block 830 is followed, leading to process block 840 and invocation of a predictive module, similar to process block 730 described above. The results from the predictive module are forwarded to a decision module, which determines at process block 850 whether the next form block should be rendered. If yes, the next form block is rendered at process block 860, and the flowchart returns to process block 820 to receive responses to this next form block. However, if the decision at process block 850 is that the next form block is not to be rendered, the "N" branch from process block 850 is followed, to skip this next form block and proceed with subsequent form blocks. First, at process block 870 a check is made whether there any more form blocks. If not, then the flowchart proceeds directly to complete the method at process block 899. If there are any subsequent form blocks after the current (skipped) "next form block," then an indicator of the next form block is incremented at process block 880, to point to the first subsequent form block.

At process block 890, a determination is made whether a new prediction, probability, or other parameter has to be obtained for any output classifier associated with the new "next form block," or for the relevance of the "next form block." If yes, then the flowchart proceeds to process block 840, invokes the predictive module, and proceeds as previously described. However, in some examples and some situations, a new prediction can be unnecessary. This can occur because there is no new data since the predictive module was last invoked, and hence no changes to any prediction or other estimate of any output classifier. In other examples, invocation of the predictive module only targets an immediately following form block, and the predictive module should be run again for the new next form block even if there is no new data. Other situations can also arise where a new invocation of the predictive module is not needed. For example, the new next form block can have a mutually exclusive relationship with the skipped form block. For example, the skipped form block can be targeted to women, and the next form block can be targeted to men, so that if the form block for women was skipped, then it can be expected that the form block for men should be rendered to the graphical display. Of course, situations can also arise where the form block for women was rendered, and it can be expected that a following form block for men should be skipped. To handle such situations, a process block similar to process block 890 can also be inserted between process blocks 830 and 840 in some examples (not shown).

In situations where the determination at process block 890 is that invocation of the prediction module is not required, the "N" branch is followed, leading to determination by the decision module at process block 850, and continuing as previously described. Because a dynamic form has a finite number of form blocks, the method eventually terminates when no more form blocks remain, from either process block 830 or process block 870.

Both methods of FIGS. 7 and 8 are suitable for offline use, for example, on a mobile device. Nevertheless, offline use is not a requirement of the innovative technologies. In other examples, a dynamic form according to the present disclosure can be operated wholly hosted on a server, for example, a server accessed through a web-browser or even a local interface. In such an example, each successive form to be rendered can be delivered through a web-browser for rendering. In other examples, the predictive module and the decision module can be hosted on a server, and the remaining functions can be client-resident. In such an example, a client can upload responses to a form block, and the server can respond with the index of the next form block to be rendered. Such examples are suitable in situations where low-bandwidth connectivity is available.

An Example Client System and Client Application

Figure 9:
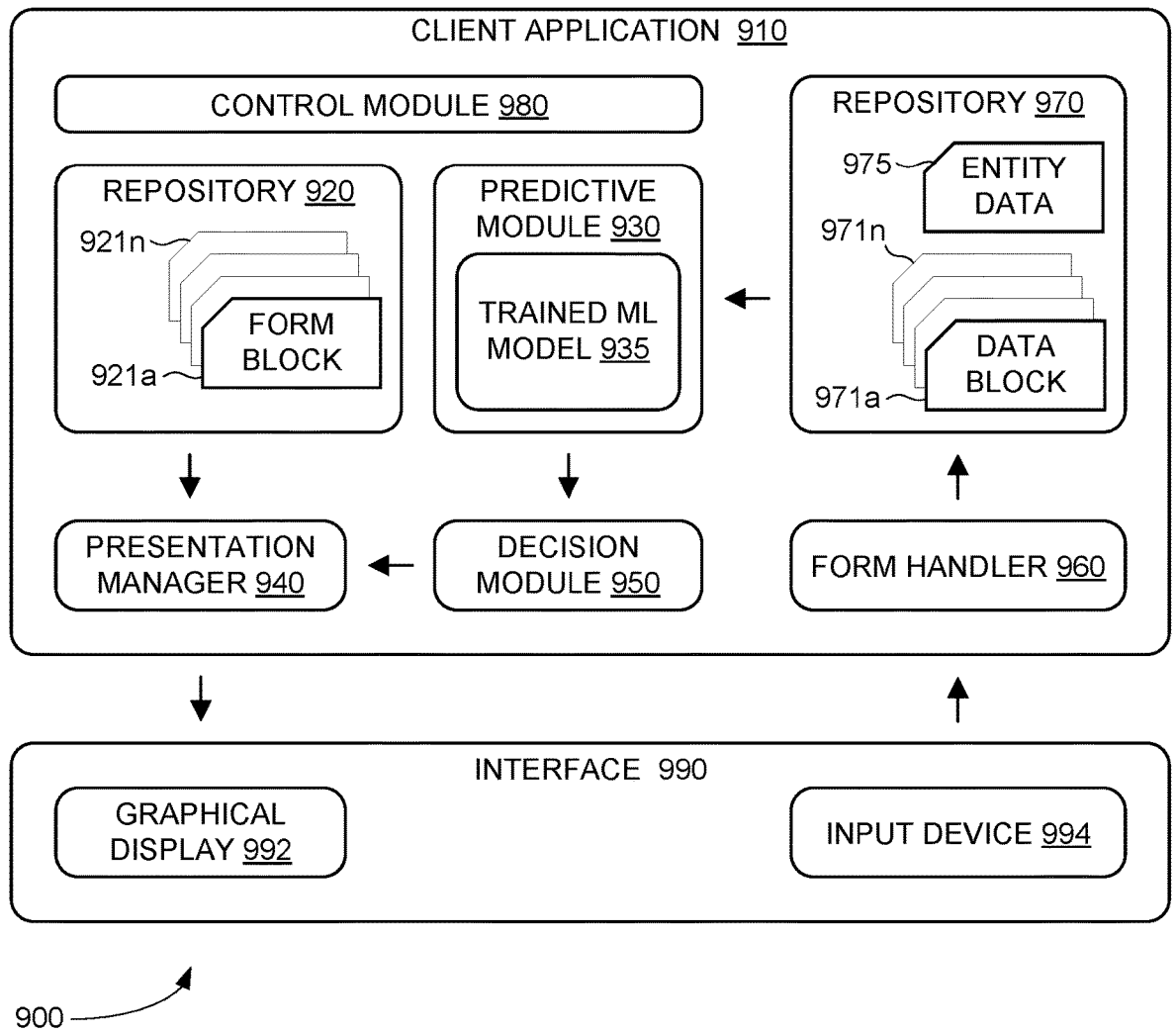
FIG. 9 is a block diagram of a client system implementing a dynamic form according to disclosed technologies.

FIG. 9 is a block diagram of a client system 900 implementing a dynamic form according to disclosed technologies. The client system 900 comprises a client application 910 and an interface 990 comprising display and input modules. In some examples, interface 990 can be a touchscreen in which the display and input modules are integrated as a single device, while in other examples, the graphical display 992 and input device 994 are implemented as separate devices. In still other examples, interface 990 can operate in text mode, and in further examples client system 900 can employ a non-graphical interface such as an audio system comprising speaker and microphone, which can be particularly advantageous for visually impaired end users, or some combination of graphical and non-graphical interfaces.

Client system 900 contains a dynamic form packaged as a client application 910, according to the disclosed technologies as described above. The client application 910 can incorporate a combination of software, in the form of processor-executable instructions, and associated data, in the form of tables, data structures, a database, or any other form known in the art, and combinations thereof. Repository 920 contains the form blocks 921a-921n of the instant dynamic form. Predictive module 930 contains the trained ML model 935. The client application 910 also contains repository 970 in which data particular to the end user is stored, including previously known end user data, shown as entity data 975, and data blocks 971a-971n containing end user responses from respective form blocks 921a-921n. The predictive module 930 is configured to receive end user data as input from repository 970, from form handler 960, from control module 980, and/or from another component. Form handler 960 is configured to receive input end user data from input device 994 and to store the received data in data blocks 971a-971n, where the received data is accessible to predictive module 930, or otherwise convey the input user data to the predictive module 930.

Decision module 950 is configured to receive output from the predictive module, as previously described. When the decision module 950 determines that a following form block is to be rendered, presentation manager 940 accesses the corresponding form block 921 from repository 920 and causes it to be rendered on the graphical display 992. Control module 980 contains logic to supervise operation of the client application 910. For example, control module 980 can be responsive to an event generated by form handler 960 indicating that new input end user data has been received and/or indicating that a new data block has been stored in repository 970, and can cause invocation of the predictive module 930. In some examples, control module 980 can follow the operational flowcharts described above in context of FIG. 7 or 8.

Although FIG. 9 shows a single repository 970, one of ordinary skill in the art will appreciate that, once configured, client system 900 can be successively offered to multiple end users. In some such examples, a plurality of repositories 970 will exist within client system 900, one for each end user. The other components of the client system 900 can be shared in common, without needing separate copies for different end users. The person of ordinary skill will also appreciate that a plurality of dynamic forms can be hosted on a single client system 900.

FIG. 9 also shows repository 970 contained within the client application 910. In some examples, repository 970 is part of a dynamic form packaged specifically for one or a group of known end users. In other examples, repository 970 is provided to the client system 900 separately from the packaged dynamic form and accessed through a socket. Similarly, the logic associated with presentation manager 940 may be distributed between logic included in the dynamic form and logic built into a client-resident browser.

An Example Operational Scenario

FIGS. 10A-10I depict an exemplary scenario involving a dynamic form according to disclosed technologies. FIG. 10A depicts a representation of a form block 1010A rendered on a graphical display. In this form block, a group of K questions 1011A1-1011AK are rendered. K can be any positive integer, as small as one, or in the range 2-5, 6-10, 11-50, 51-100, 101-1000, or even larger. Dashed rectangles represent K corresponding unfilled fields 1012A1-1012AK rendered on the display, in which responses are to be entered by an end user. In some examples, the unfilled fields 1012A1-1012AK are blank, while in other examples, the unfilled fields 1012A1-1012AK can be pre-populated with default responses, or with previously determined end user information. FIG. 10B depicts a subsequent stage of the exemplary scenario, after the end user has provided responses to the K questions. Thus the unfilled fields of FIG. 10A have been replaced by filled responses 1013A1-1013AK, shown with a solid outline. In some examples, responses to a form block can be accepted by a client application even if the form block is only partially filled. For example, some end users can be unwilling to disclose private information such as income or health history. In other examples, the client application can refuse to accept entries on a form block until all fields have been filled, or until at least certain mandatory fields have been filled. Furthermore, while it is commonplace for questions and responses to be displayed together, neither display of questions nor echoing of responses to a display is a requirement of the disclosed technologies. For example, a client can offer an audio interface, or end user responses can be echoed by dummy characters to protect sensitive information.

In FIG. 10C, responses 1013A1-1013AK from form block 1010A are provided to a predictive module 1030. In some examples, the responses 1013A1-1013AK can be stored in a repository and provided to the predictive module 1030 from the repository, while in other examples the responses 1013A1-1013AK can be provided to the predictive module 1030 directly by a form handler. Additionally, the predictive module 1030 is also provided with pre-existing information 1020B of the end user, containing at least those items of pre-existing information that are relevant to the output classifiers associated with next form block 1010B. At FIG.

10D, the predictive module 1030 produces output 1040B providing parameters, such as probabilities or predictions, related to output classifiers for a next form block 1010B.

In the present example scenario, output 1040B leads to a decision that form block 1010B should be rendered. This is shown in FIG. 10E, where L questions 1011B1-1011BL are rendered, and unfilled (or partially or wholly pre-populated) fields 1012B1-1012BL are also provided. L can be any positive integer. Similar to FIG. 10B, FIG. 10F depicts form block 1010B after it has been filled by the end user with responses 1013B1-1013BL. At FIG. 10G, the responses 1013B1-1013BL are provided to predictive module 1030, along with pre-existing end user information 1020C including at least those pieces of pre-existing information that are relevant to output classifiers associated with a following form block 1010C (not shown). In some examples, the pre-existing information 1020B and 1020C provided to the predictive module 1030 at the stages depicted in FIGS. 10C and 10G can be identical, and not filtered according to varying requirements of forms 1010B and 1010C. One or both of pre-existing information 1020B and 1020C can include all known information about the end user. At FIG. 10G, the predictive module also receives input 1014A representing information gathered from form block 1010A. In general, the predictive module can receive and use as input any combination of responses to the most recently rendered form, responses to any previously rendered form, and pre-existing end user data known before a current end user session with the dynamic form was begun. At FIG. 10H, the predictive module 1030 produces a result 1040C related to the following form block 1010C to assist in making a determination whether form block 1010C should be rendered.

In the present example scenario, output 1040C leads to a decision that form block 1010C should not be rendered (form block 1010C not shown). Since a subsequent form block 1010D is also available, the predictive module 1030 is invoked again, as shown in FIG. 10I, to provide a prediction or estimation 1040D regarding output classifiers associated with form block 1010D (not shown). At this invocation, there are no new form responses to be provided to the predictive module 1030. Rather, the predictive module 1030 is provided with previous responses 1014A from form block 1010A, and previous responses 1014B from form block 1010B, as well as pre-existing data 1020D including at least those pieces of pre-existing end user information relevant to the output classifiers of form block 1010D.

A Generalized Computer Environment

Figure 11:
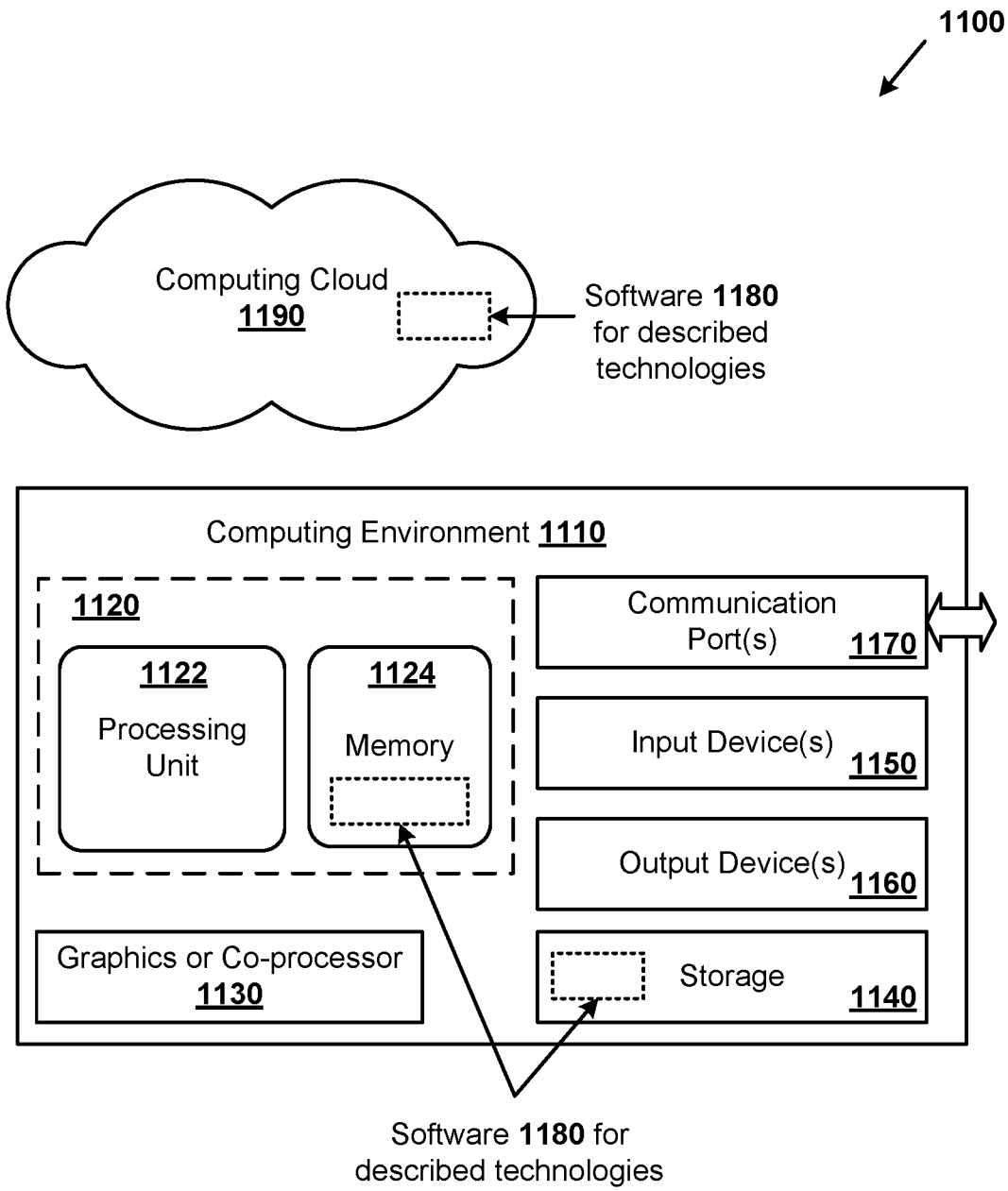
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of a dynamic form, can be implemented. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing components of application 320 of FIG. 3 or application 910 of FIG. 9, including ML component 350, trained ML model 935, predictive modules 351 or 930, and various other architectures, components, handlers, managers, modules, and repositories described herein. Processing unit 1122 can be a general-purpose central processing unit (CPU), processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store database data, including some or all of training data 331, form blocks 341 or 921, or entity data 975. The memory 1124 can also store some or all of output classifier map 343, predictive module 351, decision module 361, form handler 371, dynamic form 381, trained model 935, end user data blocks 971, and other configuration and operational data.

A computing system 1110 can have additional features, such as one or more of storage 1140, input devices 1150, output devices 1160, or communication ports 1170. An interconnection mechanism (not shown) such as a bus, controller, or network interconnects the components of the computing environment 1110. Typically, operating system software (not shown) provides an operating environment for other software executing in the computing environment 1110, and coordinates activities of the components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, or trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technology are executed. Any combination of memory 1124, storage 1140, and computing cloud 1190 can be used to software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

An Example Cloud Computing Environment

Figure 12:
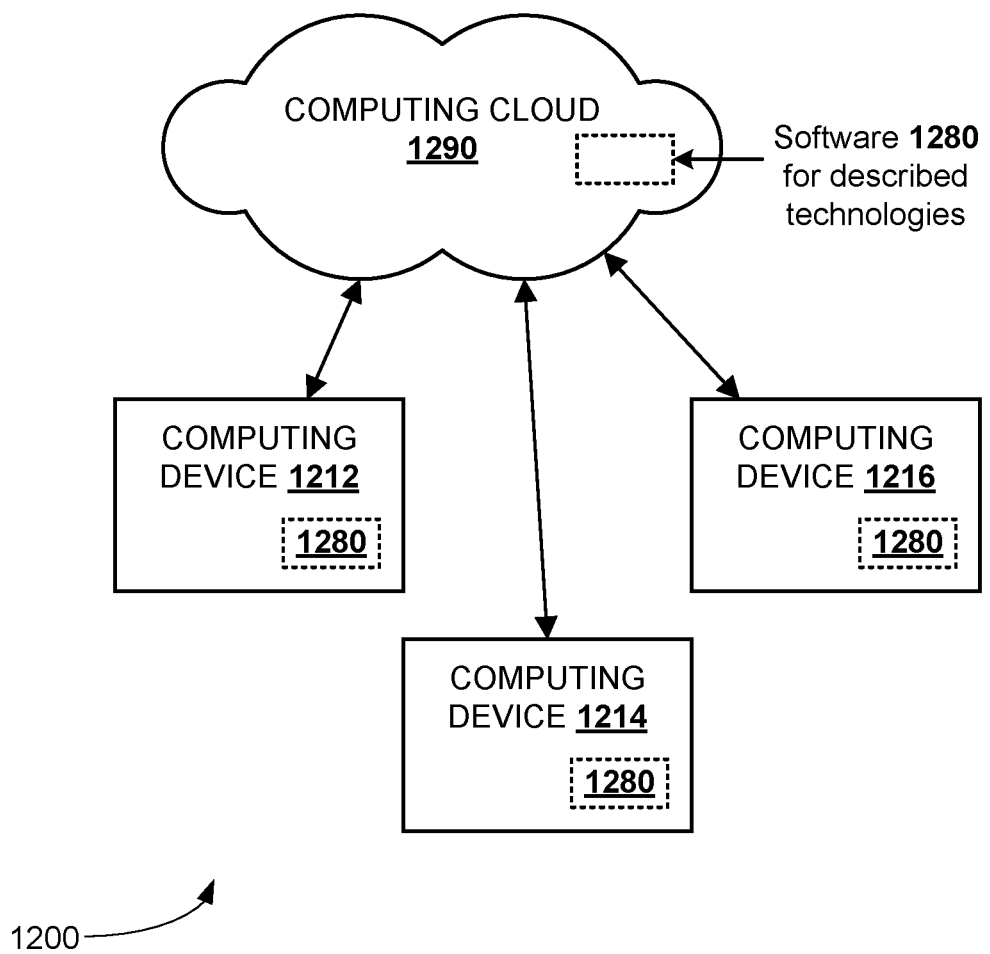
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., server, virtual machine, embedded systems, desktop, or laptop computers), mobile devices (e.g., tablet computers, smart phones, or wearable appliances), or other types of computing devices. Connections between computing cloud 1290 and computing devices 1212, 1214, and 1216 can be over wired, wireless, and optical links, or any combination thereof, and can be short-lived or long-lasting. These connections can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

TABLE OF EXAMPLE FEATURES

Different embodiments may include one or more of the innovative features shown in the following table of features, or any parts or subcombinations thereof.

TABLE 1

| Feature list |
|---|

| No. | Example Feature |
|---|---|
| | A. Building an intelligent dynamic form |
| A1 | A method for providing a dynamic form, the method comprising: training an ML model using training data which associates input data values of the training data with corresponding output classifications of form blocks, each of the form blocks including one or more input data fields. |
| A2 | A method for providing a dynamic form, the method comprising: executing an ML algorithm, using training data as input to the ML algorithm, to produce rules for predicting output classifications of form blocks, each of the form blocks including one or more input data fields. |
| A3 | The method of feature A2, further comprising: building a predictive module configured at least partly based on the rules, wherein the predictive module is configured to map input data values at runtime to parameters associated with at least some of the output classifications. |
| A4 | The method of feature A3, further comprising: linking at least one of the form blocks with the predictive module so that the input data values at runtime, when entered into the one or more input data fields of the at least one form block, are provided to the predictive module. |
| A5 | The method of feature A4, further comprising: providing a decision module configured to receive at least one of the parameters associated with the at least some of the output classifications from the predictive module, and to determine whether a given one of the form blocks is to be rendered. |
| A6 | The method of feature A5, further comprising: building the dynamic form by packaging the form blocks, the predictive module, and the decision module. |
| A7 | The method of feature A6, further comprising: receiving the form blocks. |
| A8 | The method of feature A6, further comprising: receiving the training data, the training data comprising a plurality of records, each of the plurality of records having at least one input data value and one or more of the output classifications. |

TABLE 1-continued

Feature list

| No. | Example Feature |
|---|---|
| A9 | The method of feature A6, further comprising:<br>linking the dynamic form with a presentation module configured to cause rendering of a succession of the form blocks to a user, based at least partly on determinations of the decision module. |
| A10 | The method of feature A6, further comprising:<br>deploying the dynamic form on a mobile device for offline use. |
| A11 | The method of feature A6, further comprising:<br>linking pre-existing user data as additional input to the predictive module. |
| A12 | The method of feature A6, wherein at least one of the parameters is a probability of a corresponding value of one of the output classifications. |
| A13 | The method of feature A6, wherein the ML model uses one or more of:<br>a Bayes classifier, a decision tree, logistic regression, a model ensemble, multinomial logistic regression, a neural network, a random forest, a support vector machine, or another ML technique. |
| A14 | The method of feature A6, further comprising:<br>obtaining additional training data;<br>updating the ML model and the predictive module, using at least the additional training data as input to the ML model; and<br>updating the dynamic form with the updated predictive module. |
| A15 | The method of feature A6, wherein the additional training data includes input data values for at least one additional form block and/or at least one additional output classification. |
| A16 | One or more computer-readable media comprising instructions, which when performed by one or more processors, cause performance of operations of any of features A1-A15. |
| | B. Operating an intelligent dynamic form |
| B1 | A computer-implemented method for managing how a form is rendered, comprising:<br>rendering a first block of questions in a graphical user interface. |
| B2 | The method of feature B1, further comprising:<br>invoking a predictive module based at least partly on responses to the first block of questions, to obtain a first parameter associated with an output classification associated with a second block of questions. |
| B3 | The method of feature B2, further comprising:<br>based on the first parameter, determining whether to render the second block of questions in the graphical user interface. |
| B4 | The method of feature B2, wherein the first parameter is a prediction of a value of the output classification. |
| B5 | The method of feature B2, wherein the first parameter is a probability of a value of the output classification. |
| B6 | The method of feature B2, wherein the first parameter is an indication whether all output classifications associated with the second block of questions are determined. |
| B7 | The method of any of features B3-B6, wherein the predictive module comprises a trained ML model having been trained using one or more of: a Bayes classifier, a decision tree, logistic regression, a model ensemble, multinomial logistic regression, a neural network, a random forest, or a support vector machine. |
| B8 | The method of feature B3, further comprising:<br>in response to the determination, rendering the second block of questions in the graphical user interface. |
| B9 | The method of feature B3, wherein the determination is a first determination, and further comprising:<br>in response to the first determination, rendering the second block of questions in the graphical user interface;<br>invoking the predictive module based at least partly on responses to the second block of questions, to obtain a second parameter associated with an output classification associated with a third block of questions;<br>based on the second parameter, making a second determination whether to render the third block of questions in the graphical user interface;<br>in response to the second determination, not rendering the third block of questions. |
| B10 | The method of feature B3, further comprising:<br>in response to the determination, not rendering the second block of questions. |
| B11 | The method of feature B9, wherein the first determination is also based partly on prior knowledge about an entity associated with the responses to the first block of questions. |
| B12 | The method of feature B11, wherein the predictive module comprises a trained ML model having been trained using one or more of:<br>a Bayes classifier, a decision tree, logistic regression, a model ensemble, multinomial logistic regression, a neural network, a random forest, or a support vector machine. |
| B13 | The method of feature B9, wherein the method is performed offline on a mobile device. |

TABLE 1-continued

Feature list

| No. | Example Feature |
|---|---|
| B14 | The method of any one of features B2-B13, wherein the predictive module is implemented in one or more of: JavaScript, Dart, or WebAssembly. |
| B15 | The method of feature B3, wherein the rendering is performed on a client device in response to accessing a webpage from a server, and the invoking and the determining are performed on a server. |
| B16 | The method of feature B3, wherein the invoking and the determining are implemented in one or more of: C#, PHP, Ruby, JSP, ASP, Python, or another programming or scripting language. |
| B17 | One or more computer-readable media comprising instructions, which when performed by one or more processors, cause performance of operations of any of features B1-B16. |
| | C. Systems for building, deploying, operating, and/or maintaining a dynamic form |
| C1 | A system for building, deploying, or maintaining a dynamic intelligent form, comprising: one or more server-side computers, comprising one or more first computer-readable media according to feature A16. |
| C2 | A system for operating a dynamic intelligent form, comprising: one or more client-side computers, comprising one or more second computer-readable media according to feature B16. |
| C3 | A distributed system comprising at least one system according to feature C1 and having a first network interface, at least one system according to feature C2 and having a second network interface, and a network connection connecting the first and second network interfaces. |
| C4 | The distributed system of feature C3, wherein the first computer-readable media further comprises instructions that, when executed by a processor, cause deployment of the intelligent dynamic form over the network connection to the client-side computer(s). |
| C5 | The distributed system of feature C4, wherein the intelligent dynamic form is operable on the client side computer(s) after deployment of the intelligent dynamic form, independently of the network connection. |
| C6 | The distributed system of feature C3, wherein the second computer-readable media further comprises: instructions that, when executed by a processor, cause transmission of responses to at least one block of questions over the network connection; and instructions that, when executed by a processor, cause receiving and storing the responses to the at least one block of questions. |
| C7 | The distributed system of feature C3, wherein the first computer-readable media further comprises instructions that, when executed by a processor, cause updating the intelligent dynamic form on the client-side computer(s) over the network connection. |

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "analyze," "apply," "determine," "display," "estimate," "generate," "produce," and "use" to computer operations in a computer system. These terms are high-level abstractions of the actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method for providing a dynamic form comprising a plurality of form blocks, the method comprising:
    training a machine learning model using training data comprising training input data values for first and second input data fields of the form blocks and corresponding at least first and second output values of output classifications of the form blocks, each of the form blocks including at least one of the first and second input data fields for response(s) to respective questions, and wherein the output classifications are attributes to be predicted from data entries for the first and second input data fields;
    building a predictive module comprising the trained machine learning model, wherein the predictive module is configured to map runtime input data values of the first and second input data fields to one or more predictions of the first or second output value, or one or more probabilities of the first or second output value, of at least some of the output classifications;
    linking the first and second input data fields of the form blocks with the predictive module so that the runtime input data values, when entered into the first and second input data fields of the form blocks, are provided to the predictive module;
    configuring a decision module to receive the one or more predictions of the first or second output value, or the one or more probabilities of the first or second output values, of the output classifications from the predictive module, and to determine, based on the received one or more predictions of the first or second output value, or the received one or more probabilities of the first or second output values, of the output classifications, whether a subsequent one of the form blocks is to be omitted from presentation;
    building the dynamic form by packaging the form blocks, the predictive module, and the decision module.

2. The method of claim 1, further comprising deploying the dynamic form on a mobile device for offline use.

3. The method of claim 1, further comprising linking pre-existing user data as additional input to the predictive module.

4. The method of claim 1, wherein the one or more predictions or the one or more probabilities are the one or more probabilities.

5. The method of claim 1, wherein the one or more predictions or the one or more probabilities are the one or more predictions.

6. The method of claim 1, wherein the machine learning model uses one or more of:

a Bayes classifier, a decision tree, logistic regression, a model ensemble, multinomial logistic regression, a neural network, a random forest, or a support vector machine.

7. One or more computer-readable media comprising instructions, which when performed by one or more processors, cause performance of operations comprising:
    training a machine learning model using training data comprising training values of first and second input data fields of a form block, among a plurality of form blocks, and corresponding first and second output values of an output classification of the form block, and wherein the output classification is an attribute to be predicted from data entries for the first and second input data fields;
    building a predictive module comprising the trained machine learning model, wherein the predictive module is configured to receive respective input data values of the first and second input data fields at runtime and output a prediction of the first or second output value, or a probability of the first or second output value, of the output classification;
    linking the first and second input data fields of the form block with the predictive module so that values entered into the first and second input data fields of the form block are provided to the predictive module;
    configuring a decision module to receive the prediction of the first or second output value, or the probability of the first or second output value, of the output classification from the predictive module, and to determine whether a next form block among the plurality of form blocks is to be omitted from presentation; and
    building an intelligent dynamic form by packaging the plurality of form blocks, the predictive module, and the decision module.

8. The one or more computer-readable media of claim 7, wherein the operations further comprise receiving the plurality of form blocks.

9. The one or more computer-readable media of claim 7, wherein the operations further comprise receiving the training data, the training data comprising a plurality of records, each of the plurality of records having at least one of the training values and the corresponding value, among the first and second output values, of the output classification.

10. The one or more computer-readable media of claim 7, wherein the machine learning model uses one or more of a Bayes classifier, a decision tree, logistic regression, a model ensemble, multinomial logistic regression, a neural network, a random forest, or a support vector machine.

11. The one or more computer-readable media of claim 7, wherein the operations further comprise:
    obtaining additional training data;
    updating the machine learning model and the predictive module using at least the additional training data as input to the machine learning model;
    updating the dynamic form with the updated predictive module.

12. The one or more computer-readable media of claim 11, wherein the additional training data includes input data values for at least one additional form block and/or at least one additional output classification.

13. The one or more computer-readable media of claim 7, wherein the trained machine learning model is represented as a set of rules in the predictive module.

14. The one or more computer-readable media of claim 7, wherein the building further comprises incorporating pre-existing information of an end user into the dynamic form.

15. The one or more computer-readable media of claim 7,
    wherein the form block is a first form block, the output classification is a first output classification, the prediction is a first prediction, and the probability is a first probability;
    wherein a second form block has a second output classification which can be any of a plurality of values including a third output value and a fourth output value;
    wherein the predictive module is further configured to output a second prediction of the third or fourth output value, or a second probability of the third or fourth output value, of the second output classification, based on the input data values of the first and second input data fields at runtime and without having rendered the second form block; and
    the method further comprises configuring the decision module to receive the second prediction, or the second probability, and to determine whether the second form block is to be omitted from presentation.

16. A computer-implemented method for managing how a form is rendered, comprising: rendering a first block of questions in a graphical user interface;
    invoking a trained machine learning model based at least partly on responses to the first block of questions, to obtain a prediction of a first output value or a second output value of an output classification of a second block of questions without having rendered a second block of questions in the graphical user interface, wherein the second block of questions is distinct from the first block of questions, wherein the output classification is any one of a plurality of categorical values including the first output value and the second output value, and wherein the output classification is an attribute to be predicted from responses to the first or second block of questions; and
    based on the predicted first or second output value of the output classification of the second block of questions, determining whether to render the second block of questions in the graphical user interface;
    wherein the trained machine learning model has been trained to predict the first and second output values of the output classification of the second block of questions without responses to the second block of questions, the training using one or more of: a decision tree, logistic regression, a model ensemble, multinomial logistic regression, a neural network, a random forest, or a support vector machine.

17. The method of claim 16, wherein the determination is a first determination, the method further comprising:
    in response to the first determination, rendering the second block of questions in the graphical user interface;
    invoking the trained machine learning model based at least partly on responses to the second block of questions, to obtain a predicted value of an output classification of a third block of questions;
    based on the predicted value of the output classification of the third block of questions, making a second determination whether to render the third block of questions in the graphical user interface; and
    in response to the second determination, not rendering the third block of questions.

18. The method of claim 16, wherein the method is performed offline on a mobile device.

19. The method of claim 16, wherein the rendering is performed on a client device in response to accessing a webpage from a server, and the invoking and the determining are performed on a server.

20. The method of claim 16, further comprising obtaining the responses to the first block of questions for an end user; wherein the output classification is an outcome for the end user.

\* \* \* \* \*